No. 822,450. PATENTED JUNE 5, 1906.
W. G. HATCHER.
REEL CARRIER.
APPLICATION FILED MAR. 12, 1906.
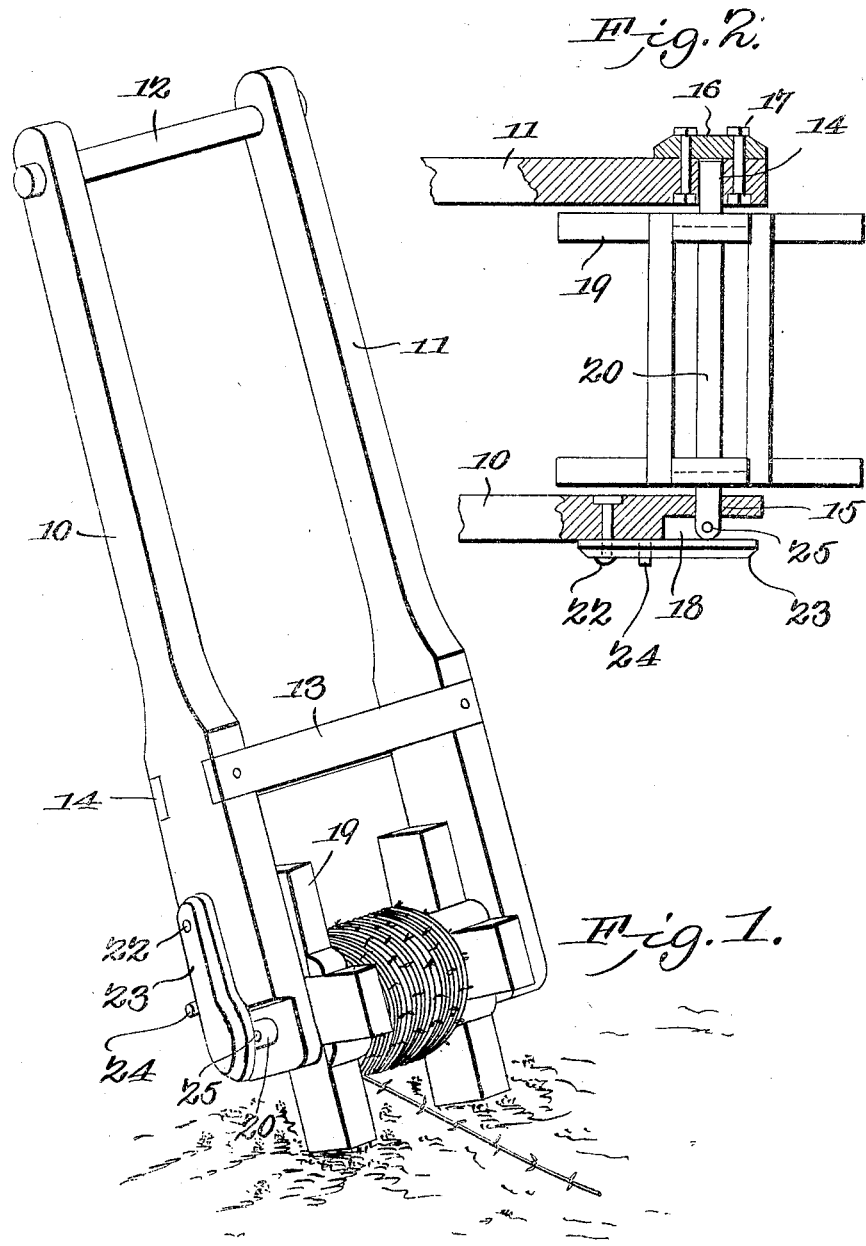
WITNESSES:
E. F. Stewart
C. N. Woodward
William G. Hatcher,
INVENTOR.
By C. A. Snow & Co.
ATTORNEYS

UNITED STATES PATENT OFFICE.

WILLIAM G. HATCHER, OF CARRINGTON, MISSOURI.

REEL-CARRIER.

No. 822,450.  Specification of Letters Patent.  Patented June 5, 1906.

Application filed March 12, 1906. Serial No. 305,676.

*To all whom it may concern:*

Be it known that I, WILLIAM G. HATCHER, a citizen of the United States, residing at Carrington, in the county of Callaway and State of Missouri, have invented a new and useful Reel-Carrier, of which the following is a specification.

This invention relates to devices for supporting and conveying reels or spools, more particularly to the reels or spools upon which fence-wire is wound, and has for its object to provide a simply-constructed device of this character whereby the reel or spool is supported and utilized to serve as a bearing wheel or truck in transporting the device and the reel carried thereby.

With this and other objects in view, which will appear as the nature of the invention is better understood, the invention consists in certain novel features of construction, as hereinafter described and claimed.

In the accompanying drawings, forming a part of this specification, and in which corresponding parts are denoted by like designating characters, is illustrated the preferred form of the embodiment of the invention capable of carrying the same into practical operation.

Figure 1 is a perspective view of the improved device. Fig. 2 is a plan view, partly in section, of a portion of the framework with one of the reels in position therein.

The improved device comprises a supporting-frame formed of spaced sides 10 11 and connected at one end by a "round" or bar 12, which serves as a handle to the framework, and connected intermediate the ends by cross-bars 13 14, the latter preferably recessed into the side members at the ends, as shown. Extending through the side members at the ends farthest from the handle 12 are apertures 14 15, the aperture 14 closed at the outer end by a stop-plate 16, secured in place by bolts 17 or other suitable fastening means.

For the purpose of illustration the stop member 16 is attached to the side member 11, and the side member 10 is formed with a recess 18 at the end containing the aperture 15. The reel indicated at 19 is of the ordinary form upon which fence-wire is supplied and is pivoted between the side members 10 11 upon a shaft 20, disposed through the apertures 14 15, with one end of the shaft projecting into the recess 18, as shown. Pivoted at 22 to the side member 10 is a stop member 23, the stop member adapted to bear against the projecting end of the shaft 20 and retain it in any position in the side members.

The swinging stop member 23 is limited in its movements in one direction by a stop-pin 24, which thus holds it substantially in alinement with the side member 10 and prevents any end movement of the shaft 20. By these means the reel 19 will be held in position between the side members and rotatively disposed upon the shaft 20, while the latter is prevented from displacement by the swinging stop 23. To remove the reel, it is only necessary to move the locking member 23 upon its pivot 22 and withdraw the shaft 20. The shaft 20 is preferably provided with an aperture 25 to receive a suitable implement to enable the shaft to be withdrawn, if required. The reel when in this position serves in a measure as a bearing-wheel which will enable the frame to be drawn over the ground and the wire unwound from the reel as fast as required. Thus in building fences the outer end of the wire is attached to the post and the frame with its reel attached drawn upon the ground alongside the posts and the wire attached in the usual manner.

The reel will readily rotate over the ground, as will be obvious. The recess 18 in the member 10 enables the projecting end of the shaft to be readily grasped by the hand of the operator when the shaft is to be removed, as will be obvious.

The device is simple in construction, can be inexpensively manufactured, and operates efficiently for the purpose described.

Having thus described my invention, what is claimed as new is—

In a device of the class described, a frame including spaced side members and transverse supporting and connecting members and with apertures in transverse alinement through said side members, a stationary closure to one of said apertures, a recess in the outer side of the side member having the opposite aperture, a shaft adapted to support a reel and extending through said apertures and bearing therein and projecting at one end into said recess, and a movable member bearing over said recess and engaging the projecting end of the shaft.

In testimony that I claim the foregoing as my own I have hereto affixed my signature in the presence of two witnesses.

WILLIAM G. HATCHER.

Witnesses:
W. H. HAMILTON,
THOS. N. BAKER.